United States Patent [19]

Williams et al.

[11] 3,841,843

[45] Oct. 15, 1974

[54] APPARATUS FOR FLUIDIZED CATALYTIC CRACKING OF HYDROCARBONS

[75] Inventors: Dale Williams; Dorrance P. Bunn, Jr., both of Houston, Tex.

[73] Assignee: Texaco Inc., New York, N.Y.

[22] Filed: Dec. 18, 1972

[21] Appl. No.: 315,769

[52] U.S. Cl................ 23/288 S, 23/288 E, 196/104
[51] Int. Cl........ B01j 9/16, F16l 55/00, F16l 59/16
[58] Field of Search........ 196/104; 23/288 S, 288 E; 208/127, 147

[56] References Cited
UNITED STATES PATENTS
3,243,265  3/1966  Annesser.......................... 23/288 S
3,492,221  1/1970  Pfeiffer.......................... 23/288 SX Primary Examiner—Norman Yudkoff
Assistant Examiner—D. Sanders
Attorney, Agent, or Firm—T. H. Whaley; C. G. Ries

[57] ABSTRACT

An apparatus for fluid catalytic cracking of hydrocarbons including an elongated confined reaction conduit comprising an elongated riser having catalyst and hydrocarbon introduction means at the lower end thereof, a flow reversal means connected to the upper end of said riser for reversing the flow direction of catalyst and hydrocarbons exiting said riser, and a downcomer forming an annular space around an upper portion of said riser for receiving catalyst and hydrocarbons from said flow reversal means and conveying them downward into a reaction vessel. Reaction methods and process conditions are given for use with the disclosed apparatus.

2 Claims, 2 Drawing Figures

APPARATUS FOR FLUIDIZED CATALYTIC CRACKING OF HYDROCARBONS

BACKGROUND OF THE INVENTION

A. Field of the Invention

The present invention relates to fluid catalytic cracking of relatively heavy hydrocarbons into useful products such as naphtha. More particularly, the present invention relates to improved apparatus for use in such a fluid catalytic cracking process.

B. Background of the Invention

In recent years, improved commercial catalytic cracking catalysts have been developed which are highly active and demonstrate increased selectivity for conversion of hydrocarbon feed such as gas-oil into naphtha at the expense of gas and coke. Examples of such improved catalytic cracking catalysts are those comprising zeolitic silica-alumina molecular sieves in admixture with amorphous inorganic oxides such as silica-alumina, etc. Experience gained from using such improved cracking catalysts has shown that advantageously, contact time between the catalyst and hydrocarbon feed under cracking conditions may be limited to obtain maximum benefits from the high catalyst activity and improved naphtha selectivity. Thus, preferably, a hydrocarbon cracking reaction is carried out with catalyst dispersed in a hydrocarbon stream moving with sufficient velocity to keep the catalyst entrained in such vapor as a dilute suspension with a minimum of back mixing.

Processes for fluid catalytic cracking of hydrocarbon feed streams are well known. The fluid cracking process sequence generally comprises contacting hot regenerated catalyst with hydrocarbon feed in a reaction zone under cracking conditions; separating cracked hydrocarbon vapors from used cracking catalyst; stripping volatile hydrocarbons from said used catalyst with a stripping vapor; regenerating stripped catalyst by burning carbonaceous deposits therefrom with oxygen; and then returning regenerated catalysts for reaction with additional hydrocarbon feed. Hydrocarbon vapors from the reaction step and the stripping step are separated into fractions including a gas product, naphtha, and one or more heavier fractions boiling above the naphtha range. Such heavy fractions may be withdrawn as product streams from the cracking process, or may, at least in part, be recycled for further cracking.

As stated above, when improved cracking catalysts having superior selectivity for producing naphtha are employed in the cracking process, the cracking reaction is preferably performed under conditions of short residence time at cracking conditions in an elongated reaction conduit. Operating conditions for a fluid catalytic cracking process employing such dispersed phase of catalyst within a hydrocarbon feed vapor include regeneration temperatures in the range of about 1,100° to about 1,500°F., regenerator dilute phase pressures in the range of about 5–50 psig, and preferably from about 20–40 psig; elongated reaction conduit outlet temperature in the range of 850°–1,200°F., preferably 925°–1,000°F. or higher; reaction zone pressures in the range of 5–50 psig; catalyst to oil weight ratios in the range of 2–20 pounds of catalyst per pound of oil. The length and cross-sectional area of the elongated reaction conduit should be sufficient to provide a vapor residence time of from about 0.5–10 seconds, preferably 1–5 seconds and to provide a superficial vapor velocity in the range of 10–30 feet per second at the inlet to the elongated reaction conduit and in the range of 20–60 feet per second near the outlet. Combinations of the above operating conditions may be employed to obtain hydrocarbon feed conversions in the 60–95 percent range, preferably 75–85 percent range, wherein hydrocarbon feed conversion is defined as that percentage of the hydrocarbon in the feed boiling above about 430°F. which is converted to hydrocarbons boiling below 430°F. and coke.

Elongated reaction conduits sized to maintain superficial vapor velocities sufficient to maintain catalyst dispersed as a dilute phase with minimum back mixing must have substantial length to obtain desired residence times for conversion of the hydrocarbon feed vapors. Known process configurations include those employing elongated reaction conduits having a substantial vertical component. Such process configurations result in tall structures for support of the elongated reaction conduit, appurtenant vessels and equipment necessary for operation of a fluid cracking process. Such tall structures are expensive to construct and maintain.

Another known process configuration, such as is shown in U.S. Pat. No. 3,607,127 patented Sept. 21, 1971, comprises an longated reaction zone having a first substantially vertical tubular section for upward flow of catalyst and hydrocarbon vapor, a horizontal tubular section connected at substantially right angles to the right angles to the first vertical section for transverse flow of the catalyst-hydrocarbon vapor mixture, and a third tubular section connected to the horizontal section for downward flow of catalyst and hydrocarbon vapor. This configuraion has the advantage that the overall height of a fluid catalytic cracking unit may be substantially reduced. However, special means are required in the elongated reaction zone at each point where the direction of flow of the catalyst-hydrocarbon vapor change direction. Additionally, such a process configuration is relatively bulky and occupies substantial space, especially where the elongated reaction zone is to be maintained within a reaction vessel.

SUMMARY OF THE INVENTION

Now, according to the present invention, an apparatus for fluid catalytic cracking of hydrocarbons is disclosed. Such apparatus includes an improved elongated, confined reaction conduit for passing a mixture of hydrocarbon vapors and catalyst therethrough. Such elongated confined reaction conduit comprises a riser, a portion of which is substantially vertical, a device for changing the direction of flow of the hydrocarbon vapor-catalyst suspension exiting the riser portion, and a substantially vertical downcomer portion forming an annulus around said riser portion.

By employing the apparatus of the present invention, an elongated confined reaction zone is provided for a hydrocarbon cracking reaction which reaction zone is compact, having a reduced vertical height, and occupying less volume in a fluid catalytic cracking reaction vessel. The elongated confined reaction zone of the present invention is particularly useful in modifying existing fluid catalytic cracking units wherein additional length of confined reaction zone may be added to an existing riser without consuming appreciable space in an existing reaction vessel. These and other advantages

DETAILED DESCRIPTION OF THE INVENTION

Figure 1:
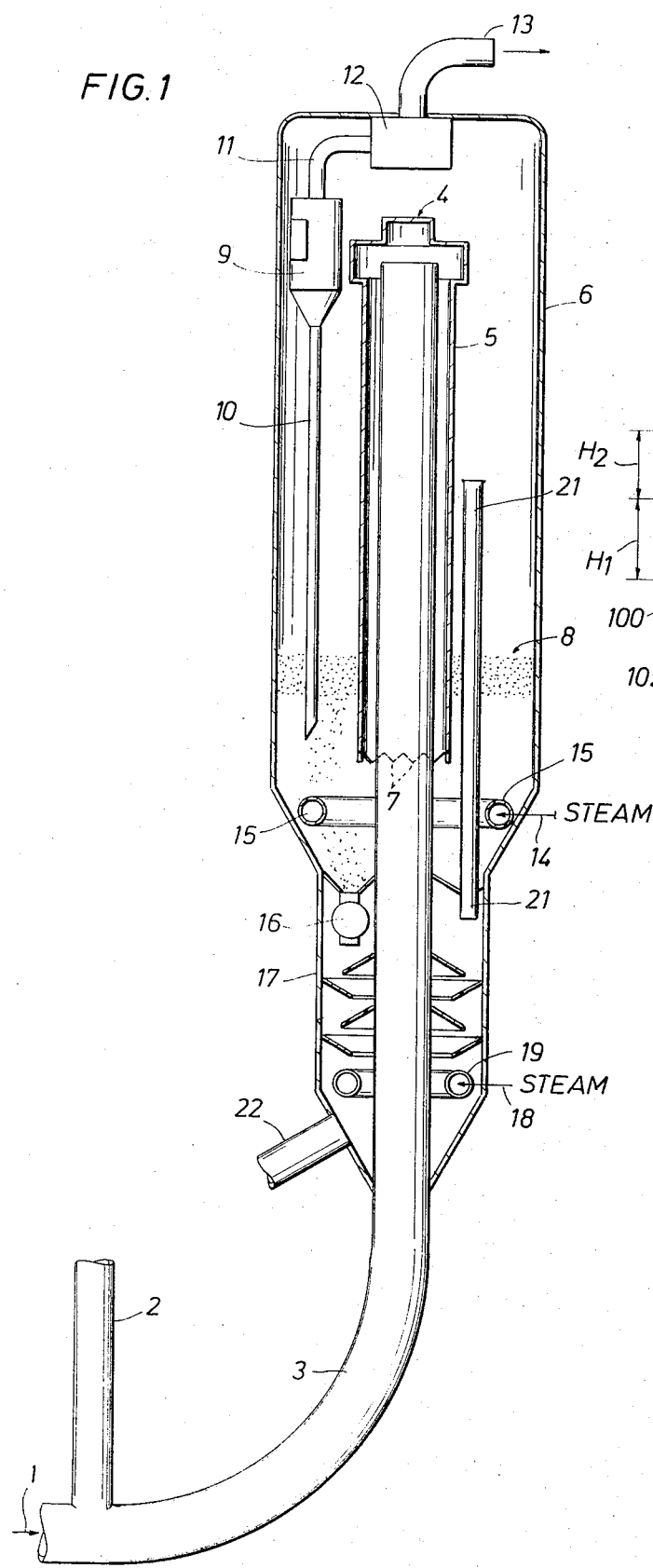
FIG. 1 of the drawings is a schematic sectional view of the reaction portion of a fluidized catalytic cracking unit showing the elongated, confined reaction zone of the present invention in relation to other elements of the fluid cracking reaction zone.

In the present invention an improved elongated, confined reaction conduit is provided for use in a fluidized catalytic cracking unit which conduit is designed for an extended period of contact between catalyst and hydrocarbon feed vapors at cracking conditions and under conditions wherein the catalyst is suspended as a dilute phase in the flowing hydrocarbon vapors. The design of the improved conduit of the present invention is such that the conduit is of reduced vertical height and occupies a minimum lateral area. Additionally, the conduit of the present invention is of substantially simpler construction than conduits of the prior art.

The elongated confined reaction conduit of the present invention comprises a riser portion having, at the lower end thereof, means for introducing hydrocarbon feed and means for introducing hot regenerated catalyst; flow reversal means located at the upper, discharge end of said riser portion for reversing the direction of flow of the catalyst-hydrocarbon vapor mixture; and a downcomer portion which receives catalyst-hydrocarbon vapor mixture from said flow reversal means. Said downcomer portion surrounds said riser portion, forming an annular space for the continued contact of catalyst and hydrocarbon vapors under desirable dilute phase conditions.

Utilization of the improved conduit reactor of the present invention within a fluid catalytic cracking process is such that hot, regenerated catalyst from a regeneration zone is combined with hydrocarbon feed in the lower end of the riser portion of said conduit and the catalyst-hydrocarbon vapor mixture discharges from the outlet of the downcomer portion of said conduit into a fluid catalytic cracking vessel. In such fluid catalytic cracking reaction vessel, catalyst and hydrocarbon vapors are disengaged. The hydrocarbon vapors, substantially free of catalyst, are transferred to separation means for recovery of desired products. Catalyst in the reaction vessel is maintained as a fluidized dense phase bed for subsequent transfer to a stripping zone and a regeneration zone. The outlet of the downcomer portion of the conduit may discharge the catalyst-hydrocarbon vapor mixture either above or below the surface of said fluidized dense phase catalyst bed maintained in the reaction vessel. For instance, should it be desirable to obtain further cracking of hydrocarbon vapors above that experienced in the confined conduit, then the downcomer outlet may be positioned below the surface of a fluidized catalyst bed in the reaction vessel and the hydrocarbon vapors exiting the downcomer portion will undergo additional contact with catalyst as said vapors pass upward through the fluidized catalyst bed. On the other hand, should it be desirable to limit cracking substantially to that experienced in the elongated conduit, then the downcomer outlet may be positioned such that the catalyst-hydrocarbon vapor mixture discharges above said fluidized bed and contact between hydrocarbon vapor and catalyst is limited substantially to that within the elongated conduit. In practice, an elongated conduit as envisoned herein will be permanently located within a fluidized cracking vessel and the selection of downcomer discharge either above or below the fluidized catalyst bed is made by adjusting the level of fluidized bed maintained in said reaction vessel.

The elongated conduit reaction zone contemplated herein may be completely or partially contained within the fluidized cracking reaction vessel, which vessel serves as a zone for further cracking of hydrocarbons and/or as a catalyst-hydrocarbon vapor disengaging zone. The elongated reaction conduit of the present invention is particularly useful where it is desired to limit modifications of the cracking unit to the reaction side and wherein the reaction vessel is already in existence.

In flowing streams comprising hydrocarbon vapors and catalyst particles wherein the velocity is sufficient to maintain the catalyst particles suspended as a dilute phase, erosion of the reaction conduit must be considered. The maximum potential for erosion occurs in the elongated reaction conduit of the present invention within the flow reversal means. In the flow reversal means, catalyst particles exiting the riser portion of the conduit impinge directly upon the walls of the flow reversal means. It has been observed that erosion by impingement of catalyst particles may be substantially reduced when the angle of impingement is about 90° to the surface being impinged. Consequently, the flow reversal means, as disclosed in the present invention is designed such that catalyst impingement upon the walls thereof is maintained at about 90° throughout the process of reversing the direction of flow of the catalyst-hydrocarbon vapor mixture. Additionally, it has been noted that erosion of surfaces by impingement of catalyst particles may be substantially reduced by employing a refractory lining upon the surface being impinged. Consequently, it is within the contemplation of this invention that the interior surfaces of the flow reversal means be covered by a refractory material according to methods well known in the art of constructing fluidized catalytic cracking units.

In order to further described the improved elongated reaction conduit of the present invention, attention is now drawn to the drawing attached to this application.

FIG. 1 of the drawings is a schematic representation of the reaction side of a fluidized catalytic cracking unit showing the improved conduit of the present invention in relation to other elements of the reaction section of a fluidized cracking unit. Many elements commonly employed in a commercial fluidized cracking unit, but which are unnecessary to show the invention herein have been omitted. Such omitted elements may be supplied by one skilled in the art.

Figure 2:
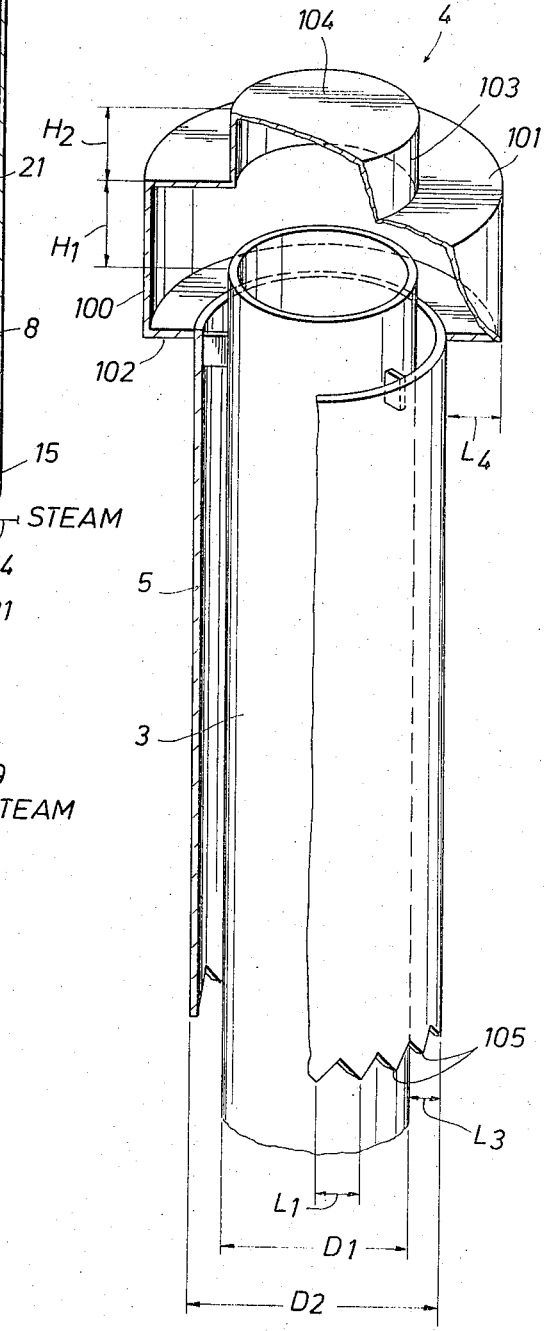
FIG. 2 of the drawing is a detailed sectional view of the elongated confined reaction zone of the present invention.

FIG. 2 of the drawings is a detail of the upper portion of the elongated reaction conduit of the present invention showing the functional connection between the riser portion, the flow reversal means and the downcomer portion. It is to be understood that these drawings and the description which follows are for the purpose of illustration only and are not intended to serve as limitations upon the present invention. These drawings show one embodiment of the present invention, and other embodiments coming within the scope of the appended claims will occur to those skilled in the art.

In FIG. 1, preheated hydrocarbon feed from line 1 and hot, regenerated catalyst from line 2 enter the bottom portion of riser conduit 3 wherein hot catalyst and oil are mixed to form a dilute phase mixture of catalyst particles suspended in a flowing hydrocarbon vapor stream. The hydrocarbon vapor-catalyst mixture, having a superficial velocity in the range of about 10 to about 60 feet per second rises upward through riser conduit 3 under cracking conditions including a temperature in the range of from about 800°–1,200°F. and exit the upper end of riser conduit 3 into flow reversal means 4. In flow reversal means 4, the directional flow of the hydrocarbon vapor-catalyst mixture is reversed 180°. From flow reversal means 4 hydrocarbon vapors and catalyst enter the top of downcomer 5. Downcomer 5 comprises a conduit open at both ends located such that riser conduit 3 passes through downcomer 5 in such manner that an annular space for the flow of catalysts and hydrocarbon vapors is formed between the outer wall of riser conduit 3 and the inner wall of downcomer 5. Catalyst and hydrocarbon vapor exits downcomer 5 at its lower end and enters reaction vessel 6. The lower end of downcomer 5 is equipped with distribution equilizers 7 which comprise V-shaped extensions of the lower end of downcomer 5. The distribution equilizers 7 define V-shaped slots through which hydrocarbon vapors are evenly distributed within reaction vessel 6.

In FIG. 1, the bottom exit end of downcomer 5 is shown located below the upper surface 8 of a fluidized bed of catalytic cracking catalyst. Hydrocarbon vapors entering reaction vessel 6 from downcomer 5 pass upwardly through the fluidized bed of catalyst and disengage the fluidized bed at its upper surface 8. Under such operating conditions hydrocarbon vapors leaving the conduit reaction means are subjected to additional cracking within the fluidized bed of catalyst. If it is desirable that hydrocarbon cracking be limited substantially to that within the elongated reaction conduit, the inventory of fluidized catalyst within reaction vessel 6 may be reduced such that the upper surface 8 of the fluidized bed is below the bottom outlet of downcomer 5.

Hydrocarbon vapors disengaging the upper surface 8 of the fludized catalyst bed, pass into cyclone separator 9 for separation of any entrained catlyst therefrom. Separated catalyst from cyclone separator 9 is returned to the fluidized bed via dip leg 10 and hydrocarbon vapors substantially free of catalyst are passed via line 11 into plenum 12. It is to be understood that cyclone separator 9 as shown is representational only and such cyclone separator may comprise a plurality of such separators in series and parallel configuration as required to give substantially complete separation of hydrocarbon vapors from entrained catalyst. From plenum 12, hydrocarbon vapors pass via line 13 to separation facilities, not shown, wherein the cracked hydrocarbon vapors are separated into fractions including a gas fraction, a naphtha fraction, and one or more fractions higher boiling than naphtha. Such higher boiling fractions may be recovered as products of the process, or may be recycled in whole or in part to the fluid cracking process for additional conversion.

In FIG. 1, steam from line 14 enters primary steam ring 15 from which it is passed into reactor vessel 6. Steam from primary steam ring 15 serves to maintain the catalyst inventory of reactor vessel 6 as a fluidized bed. In addition, the primary steam serves to strip a portion of volatile hydrocarbons which may be occluded upon the spent cracking catalyst contained within the fluidized bed.

From reactor vessel 6 catalyst passes through slide valve 16 into stripping zone 17. Steam from line 18 enters steam ring 19 from which said steam is distributed into the lower portion of stripping zone 17. Thus, additional volatile hydrocarbons which may be occuluded upon such catalysts are stripped therefrom. Stripper effluent vapor, comprising steam and hydrocarbons, passes from stripping zone 17 via stripper vent line 21 into reactor vessel 6 wherein such stripping effluent vapors are released above the upper surface 8 of the fluidized catalyst bed. Such stripper effluent vapors are recovered from reaction vessel 6 along with hydrocarbon vapors from the cracking reaction and primary stripping steam.

In FIG. 1, stripped catalyst from stripping zone 17 is withdrawn via line 22 and transferred to a regeneration zone, not shown. In the regeneration zone, stripped catalyst, containing nonvolatile carbonaceous deposits (coke) is regenerated by burning such carbonaceous deposits with an oxygen containing gas, e.g., air. Regenerated catalyst from the regeneration zone is returned via line 2 to the lower portion of riser conduit 3 for contact with additional hydrocarbon feed, as described hereinabove.

FIG. 2 of the drawing is a cut-away sectional view of the upper portion of the elongated reaction conduit of the present invention showing the elements thereof in greater detail.

In FIG. 2, riser conduit 3 passes upward through downcomer conduit 5 in such manner to form an annular space between the outer wall of riser conduit 3 and the inner wall of downcomer conduit 5. The cross-sectional area of riser conduit 3 is sized, considering operating conditions including flow rate, pressure, temperature, etc., to maintain therein a superficial vapor velocity above about 12 feet per second and preferably in the range of from about 20 to about 40 feet per second. The diameter of downcomer 5 is selected such that the cross-sectional area of the annular space is no less than the cross-sectional area of riser conduit 3 and preferably the annular cross-sectional area is about twice the cross-sectional area of riser conduit 3. The combined length of riser conduit 3 and downcomer 5 is selected such that the residence time of hydrocarbon vapor within the elongated reaction conduit is in the range of from about 0.5 to about 10 seconds, and preferably in the range of from about 1 to about 5 seconds.

In FIG. 2, the upper end of riser conduit 3 terminates above the upper end of downcomer 5 and within cylinder body 100 of flow reversal means 4. The height above downcomer conduit 5 at which riser conduit 3 terminates is preferably equal to about one-fourth the diameter of riser conduit 3, although such dimension is not critical to the invention. Flow reversal means 4 comprises a cylinder body 100 having a cover plate 101 and a bottom ring 102 connected thereto. The diameter of cylinder body 100 is larger than the diameter of downcomer conduit 5. Preferably the diameter of cylinder body 100 is such that the distance from the outer wall of downcomer 5 to the inner wall of cylinder body 100 is equal to about one-half the width of the annulus formed between the outer wall of riser conduit 3 and the inner wall of downcomer conduit 5, although this dimension is not critical and substantial deviation may exist without adversely affecting operation of the device of the present invention. Bottom ring 102 is positioned such that it spaces the bottom of cylinder body 100 from the top of downcomer 5 and forms a vapor tight seal therebetween. Bottom ring 102 is connected to downcomer 5 and cylinder body 100 by connecting means such as welding. The height of cylinder body 100 is such that the distance from the top of riser conduit 3 to the top of cylinder body 100 is at least equivalent to about one-fourth the diameter of riser conduit 3, although greater separation may be employed without adverse effect. Cylinder body 100 is covered by cover plate 101 and atached thereto by connecting means such as welding. Cover plate 101 comprises a flat plate having a centrally located hole which is concentric with the opening in riser 3 and which is of substantially the same diameter as riser conduit 3. A hollow cylindrical member 103 is positioned on the top of cover plate 101 such that hollow cylindrical member 103 surrounds the hole in cover plate 101. Hollow cylindrical member 103 is open at the bottom and covered at the top with top plate 104. Hollow cylindrical member 103 is attached to cover plate 101 and to top plate 104 by connecting means such as welding. If desired, flow reversal means 4 may be interiorally lined with refractory material to substantially reduce the danger of equipment failure due to erosion from impinging catalyst particles. In such case, refractory materials may be attached to the interior of flow reversal means 4 by means well known to those familiar with construction of fluidized catalytic cracking units. Should refractory lining of flow reversal means 4 be employed, then the dimensions of flow reversal means 4 must be such that the clearances between riser conduit 3, downcomer 5, and flow reversal means 4 are acceptable as measured from the interior surface of the refractory lining.

In FIG. 2, the operation of the improved elongated reaction conduit of the present invention is as follows: A catalyst-hydrocarbon vapor mixture flowing upwardly exits riser conduit 3 into the interior of flow reversal means 4 at a velocity in the range of from about 25 to about 60 feet per second. High velocity catalyst particles exiting riser conduit 3 tend to proceed upwardly and strike the top of flow reversal means 4. According to the present invention, a substantial portion of such high velocity catalyst particles passes upwardly through the hole in cover plate 101 and impinge upon the inner surface of top plate 104. As top plate 104 is substantially perpendicular to the direction of flow of catalyst and hydrocarbon vapors in riser conduit 3, such catalyst particles tend to strike top plate 104 at an angle of about 90° which has been found to produce the least amount of erosion. By having top plate 104 spaced somewhat above cover plate 101, a relatively dead space is formed in which vapor velocities are quite low such that catalyst particles may accumulate and thereby form a cushion to protect top plate 104 from erosion by impingement of additional high velocity catalyst particles. Vapors from riser conduit 3 are forced into cylinder body 100 from which they then flow into the annular space formed by riser conduit 3 and downcomer 5. The vapor space within cylinder body 100 is sufficiently large to avoid excessively high velocities therein. The preferred dimensions given in the paragraphs above for spacing between riser conduit 3, downcomer 5 and the interior surfaces of flow reversal means 4 have been selected such that excessively high vapor velocities do not occur within the interior of flow reversal means 4. Catalyst particles which have lost their vertical component of velocity in flow reversal means 4 are carried by the vapor stream from above the outlet of riser conduit 3, and such catalyst particles strike the wall of cylinder body 100 at an angle of about 90°. Again, as has been noted above, minimum erosion occurs by impingement of catalyst when the angle of impingement is about 90°. Catalysts and hydrocarbon vapor from the interior of flow reversal means 4 pass into the annular space between downcomer 5 and riser conduit 3 and such catalyst-hydrocarbon mixture is discharged from the lower end of downcomer 5.

In FIG. 2 the lower end of downcomer 5 terminates in a plurality of evenly spaced distribution equalizers 105 which comprise triangular shaped extensions to downcomer 5 and which distribution equalizers 105 defined a plurality of V-shaped notches in the bottom edge of downcomer 5. Catalyst particles flowing downwardly in downcomer 5 possess a momentum component which tends to maintain their downward direction, while hydrocarbon vapor tends to flow horizontally through the V-notches in the bottom of downcomer 5, thereby disengaging catalyst particles from the hydrocarbon vapor.

From the above it can be seen that an improved elongated conduit reaction means has been disclosed for use in a fluidized catalytic cracking unit which conduit means is simple in construction, is of reduced elevation, and occupies a minimum amount of space. The above description of the improved conduit reaction means is for a preferred embodiment thereof and many changes and modifications will be obvious to those skilled in the art which are within the spirit and scope of the present invention. Therefore, no limitation upon the improved conduit reaction means of the present invention is intended other than limitations contained in the appended claims.

We claim:

1. In a fluidized catalytic cracking reactor vessel comprising an enclosed, vertically elongated shell defining a lower zone for fluidized catalyst and an upper zone for separation and recovery of hydrocarbon vapors, an elongated riser conduit extending vertically into the lower portion of said reactor vessel forming an upwardly directed confined cracking path, an elongated downcomer conduit, open at each end, vertically disposed around the upper portion of said elongated riser conduit forming a downwardly directed annular cracking path communicating at the lower end with the interior of said reactor vessel, and flow reversal means communicating with the interior of said riser conduit and the annular space between said riser conduit and said downcomer conduit at the upper end thereof; improved flow reversal means which comprise:

a. a vertical cylinder body enclosing the upper end of said riser conduit and the upper end of said downcomer conduit;

b. a bottom ring, wherein the outer edge of said ring is attached to the lower edge of said vertical cylinder body and the inner edge of said ring is attached to the upper edge of said downcomer conduit, thereby spacing the wall of said vertical cylinder body from the wall of said downcomer conduit and forming a vapor tight seal therebetween;

c. a cover plate attached to the upper end of said vertical cylinder body, having an opening of substantially the same diameter as the riser conduit and concentric therewith;

d. a hollow cylindrical member surrounding the opening in said cover plate; and e. a top plate covering the upper end of said hollow cylindrical member, wherein the plane surface of said top plate is perpendicular to the vertical axis of said riser conduit.

2. The flow reversal means of claim 1 wherein the riser conduit extends above the lower edge of said vertical cylinder body for a distance equivalent to about one-fourth the diameter of said riser conduit; and wherein the annular separation of the vertical cylinder body from the downcomer conduit is equivalent to about one-half the annular separation of the downcomer conduit from the riser conduit.

* * * * *